(12) United States Patent
Liu et al.

(10) Patent No.: US 12,040,948 B2
(45) Date of Patent: Jul. 16, 2024

(54) METHOD AND ELECTRONIC DEVICE FOR GROUPING OBJECTS IN DATA MANAGEMENT SYSTEM

(71) Applicant: DELL PRODUCTS L.P., Round Rock, TX (US)

(72) Inventors: Weiyang Liu, Shanghai (CN); Qi Wang, Shanghai (CN); Ren Wang, Shanghai (CN); Cheng Yang, Shanghai (CN); Yuanyi Liu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/824,298

(22) Filed: May 25, 2022

(65) Prior Publication Data
US 2023/0336427 A1    Oct. 19, 2023

(30) Foreign Application Priority Data
Apr. 14, 2022  (CN) .......................... 202210395937.8

(51) Int. Cl.
| H04L 41/12 | (2022.01) |
| G06F 18/22 | (2023.01) |
| H04L 41/0893 | (2022.01) |
| H04L 43/0876 | (2022.01) |

(52) U.S. Cl.
CPC .............. *H04L 41/12* (2013.01); *G06F 18/22* (2023.01); *H04L 41/0893* (2013.01); *H04L 43/0876* (2013.01)

(58) Field of Classification Search
CPC .. G06F 18/22; H04L 41/0893; H04L 43/0876
See application file for complete search history.

(56) References Cited

U.S. PATENT DOCUMENTS

| 2011/0145249 A1* | 6/2011 | Joshi ....................... G06F 16/81 |
| | | 707/738 |
| 2013/0227113 A1* | 8/2013 | Baras .................. H04L 41/0893 |
| | | 709/224 |

(Continued)

*Primary Examiner* — Viet D Vu
(74) *Attorney, Agent, or Firm* — WOMBLE BOND DICKINSON (US) LLP

(57) ABSTRACT

Embodiments of the present disclosure provide a method, an electronic device, and a computer program product for grouping objects in a data management system. The method includes: detecting operation parameters of at least two of a plurality of objects in a data management system, and determining a rate of correlation between the at least two objects based on the detected operation parameters, wherein the rate of correlation indicates a degree of correlation between the at least two objects. The method further includes: comparing the determined rate of correlation with a predetermined threshold, and determining, based on the comparison of the determined rate of correlation with the predetermined threshold, grouping of the at least two objects. With this method, objects with a high degree of correlation are logically grouped together, so that a user can manage objects in batches in an efficient manner during object management, thus improving the system performance. In particular, data consistency can be maximized in the process of data protection and restoration.

16 Claims, 8 Drawing Sheets

(56) References Cited

U.S. PATENT DOCUMENTS

2013/0290238 A1* 10/2013 Griffith ................ G06N 5/025
706/47
2014/0278517 A1* 9/2014 Patel ................ G06Q 10/0637
705/2

* cited by examiner

METHOD AND ELECTRONIC DEVICE FOR GROUPING OBJECTS IN DATA MANAGEMENT SYSTEM

CROSS-REFERENCE TO RELATED APPLICATION

This patent application claims priority, under 35 U.S.C. § 119, of Chinese Patent Application No. 202210395937.8, filed Apr. 14, 2022, which is incorporated by reference in its entirety.

TECHNICAL FIELD

Embodiments of the present disclosure relate to the field of computer system processing and, more specifically, to a method, an electronic device, and a computer program product for grouping objects in a data management system.

BACKGROUND

In a data management system, there are a large number of objects that need to be managed (also referred to as assets). Examples of objects may include, but are not limited to, virtual machines, file systems, databases, various types of data resources, and the like.

In a distributed data management system, various objects are typically distributed in multiple computing nodes. Accordingly, the management of these objects needs to be performed across computing nodes. In the prior art, most of the time, the objects are managed separately, that is, a client chooses objects that need to be managed, and the data management system backs up the objects chosen by the client in different physical addresses. For example, when objects have a problem and thus need to be recovered, the client chooses which object or objects to recover. However, such technique has certain drawbacks. Namely, separate backups or recoveries for objects may cause inconsistencies between data of the objects, thus failing to achieve the purpose of data management (especially in data protection).

In addition, in the prior art, although there is grouping management of objects, different objects are usually grouped by means of manual labeling. For example, the data management system provides a graphical user interface, and a user manually groups objects according to prompt information in the graphical interface. However, such method is not easy to use, not friendly to non-IT professionals, and easy to cause omissions, and therefore, the effect of data management is not satisfactory.

SUMMARY OF THE INVENTION

Embodiments of the present disclosure provide a method, an electronic device, and a computer program product for grouping objects in a data management system.

According to a first aspect of the present disclosure, a method for grouping objects in a data management system is provided. Here, the data management system includes a plurality of objects, and the plurality of objects operate on the data management system. The method includes detecting operation parameters of at least two of the plurality of objects. The method further includes determining a rate of correlation between the at least two objects based on the detected operation parameters, wherein the rate of correlation indicates a degree of correlation between the at least two objects. The method further includes comparing the determined rate of correlation with a predetermined threshold, and determining, based on the comparison of the determined rate of correlation with the predetermined threshold, grouping of the at least two objects.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: detecting operation parameters of at least two of a plurality of objects; determining a rate of correlation between the at least two objects based on the detected operation parameters, wherein the rate of correlation indicates a degree of correlation between the at least two objects; comparing the determined rate of correlation with a predetermined threshold; and determining, based on the comparison of the determined rate of correlation with the predetermined threshold, grouping of the at least two objects.

According to a third aspect of the present disclosure, a computer program product is provided, which is tangibly stored on a non-volatile computer-readable medium and includes machine-executable instructions which, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Figure 1:
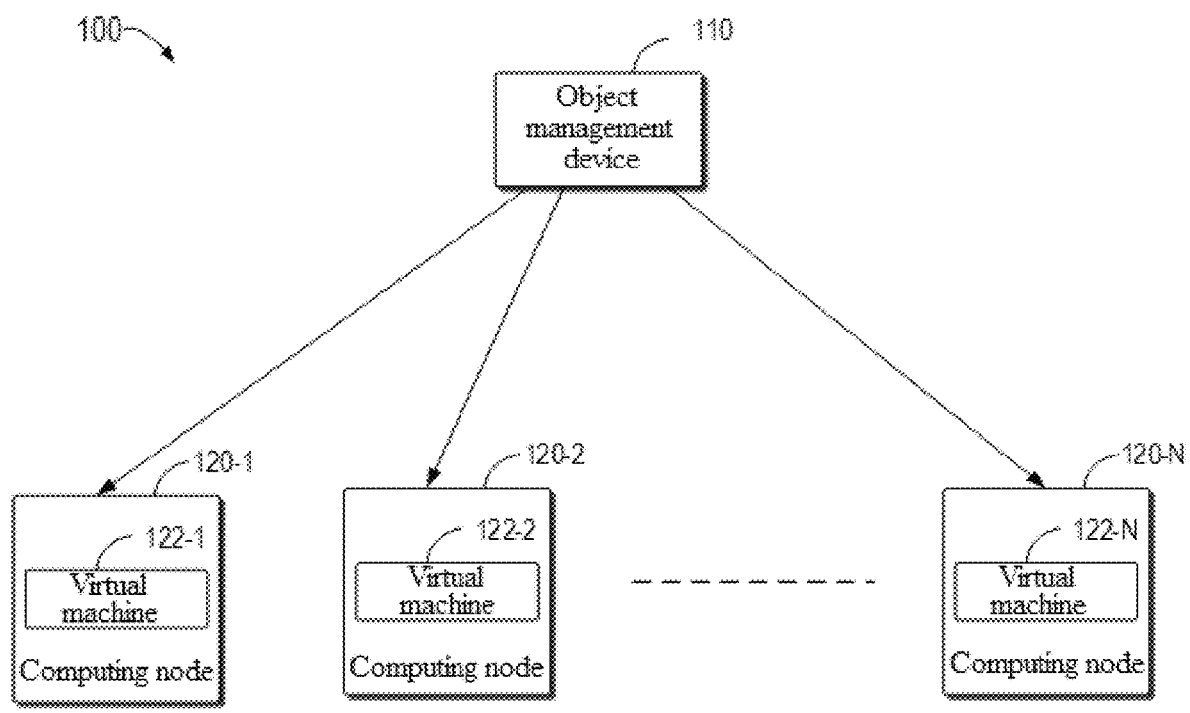
FIG. 1 illustrates a schematic diagram of example environment 100 in which a device and/or a method according to an embodiment of the present disclosure can be implemented.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a data management system, there are a large number of objects that need to be managed (also referred to as assets). Examples of objects may include, but are not limited to, virtual machines, file systems, databases, various types of data resource objects, and the like. Grouping objects in a data management system allows for more efficient management of the objects, for example, but not limited to, storing objects, protecting objects, rebuilding and recovering objects, and the like.

In a distributed data management system, various objects are typically distributed in multiple computing nodes. Accordingly, the management of these objects also needs to be performed across computing nodes. In the prior art, most of the time, the objects are managed separately, that is, a client chooses objects that need to be managed, and the data management system backs up the objects chosen by the client in different physical addresses. For example, when objects have a problem and thus need to be recovered, the client chooses which object or objects to recover. However, such technique has certain drawbacks. Namely, separate backups or recoveries for objects may cause inconsistencies between data of the objects, thus failing to achieve the purpose of data management (especially in data protection).

In addition, in the prior art, although there is grouping management of objects, different objects are usually grouped by means of manual labeling. For example, the data management system provides a graphical user interface, and a user manually groups objects according to prompt information in the graphical interface. However, such method is not easy to use, not friendly to non-IT professionals, and easy to cause omissions, and therefore, the effect of data management is not satisfactory.

At least to address these and other potential problems, embodiments of the present disclosure propose a method for grouping objects in a data management system. The method includes: detecting operation parameters of at least two of a plurality of objects; determining a rate of correlation between the at least two objects based on the detected operation parameters, wherein the rate of correlation indicates a degree of correlation between the at least two objects; comparing the determined rate of correlation with a predetermined threshold; and determining, based on the comparison of the determined rate of correlation with the predetermined threshold, grouping of the at least two objects. With this method, the data management system can automatically detect the degree of correlation between objects based on the operation status of the system and logically group objects with a high degree of correlation together according to the degrees of correlation between the objects, so that the user can manage objects in batches in an efficient manner during object management, thus improving the system performance. In particular, data consistency can be maximized in the process of data protection and restoration. In addition, the method may be automatically performed without manual operation by the user, thus improving the user-friendliness of the system and also enhancing the user experience.

Embodiments of the present disclosure will be further described in detail with reference to the accompanying drawings below. FIG. 1 is a schematic diagram of example environment 100 in which the embodiments of the present disclosure can be implemented.

Included in example environment 100 are object management device 110 and a plurality of computing nodes 120-1 to 120-N (where N is a positive integer greater than 1). There are operational objects in computing nodes, such as virtual machines, file systems, databases, and various types of data resource objects. In the example of FIG. 1, only virtual machines 122-1 to 122-N are illustrated as an example, wherein each of the virtual machines 122-1 to 122-N operates on a corresponding one of computing nodes 120-1 to 120-N, respectively.

It should be understood that FIG. 1 is only an example and that, in addition to virtual machines 122-1 to 122-N, there may be various other objects running in the computing nodes in data management system 100, for example, file systems, databases, and various other types of objects. Further, the type and number of objects running in one computing node may also be different from the type and number of objects running in another computing node. For brevity, the present disclosure will be illustrated in the specification and the accompanying drawings with virtual machines as an example of objects, where a plurality of virtual machines are distributed across a plurality of computing nodes in the data management system, and one or more virtual machines may run in each computing node.

In embodiments of the present disclosure, object management device 110 may include any physical or virtual computing device. Computing node 120-i ($1 \leq i \leq N$, i being a positive integer) may include any physical or virtual central processing unit, dedicated processing unit, special accelerator, and the like. In addition, computing node 120-i may further include, but is not limited to, personal computers, server computers, handheld or laptop devices, mobile devices (such as mobile phones, personal digital assistants (PDAs), and media players), multiprocessor systems, consumer electronics, minicomputers, mainframe computers, distributed computing environments including any of the above systems or devices, and the like. However, the protection scope of the present disclosure is not limited thereto, but may be applied to various computing elements, units, modules, or systems that can provide input and output processing capabilities.

Communication may be conducted via a network among computing nodes 120-1 to 120-N and between computing node 120-i and object management device 110. The network includes various types of wired networks and/or wireless networks. In addition, communication may also be conducted via various types of buses among computing nodes 120-1 to 120-N and between computing node 120-i and object management device 110, which is not limited in the present disclosure.

In the example shown in FIG. 1, virtual machines are used as an example for description. A plurality of virtual machines 122-i operate on the plurality of computing nodes 120-i, and virtual machines 122-i have operation parameters. The operation parameters indicate parameters associated with the operation of the virtual machines. For example, the operation parameters may include at least a communication connection value indicating a state of connection between virtual machine 122-i and other virtual machines 122-j ($1 \leq j \leq N$, $j \neq i$, and j is a positive integer) and the traffic of communication between each virtual machine and other virtual machines, and/or a rate of utilization of resources in computing node 120-i by virtual machine 122-i, where the utilized resources may include, but are not limited to: one or more of processor resources, memory resources, and virtual disk resources.

Object management device 110 in data management system 100 detects operation parameters of at least two of a plurality of objects; a rate of correlation between the at least two objects is determined based on the detected operation parameters, wherein the rate of correlation indicates a degree of correlation between the at least two objects; the determined rate of correlation is compared with a predetermined threshold; and grouping of the at least two objects is determined based on the comparison of the determined rate of correlation with the predetermined threshold.

The description in FIG. 1 using virtual machines 122-i as an example is only an example, and it should be understood that file systems, databases, and various types of data resource objects may also be grouped according to embodiments of the present disclosure.

With this method, data management system 100 can automatically detect the degree of correlation between objects based on the operation status of system 100 and logically group objects with a high degree of correlation together according to the degrees of correlation between the objects, so that the user can manage objects in batches in an efficient manner during object management, thus improving the system performance. In particular, data consistency can be maximized in the process of data protection and restoration. In addition, the method may be automatically performed without manual operation by the user, thus improving the user-friendliness of the system and also enhancing the user experience.

A block diagram of example system 100 in which embodiments of the present disclosure can be implemented has been described above with reference to FIG. 1. Method 200 for grouping objects in a data management system according to an embodiment of the present disclosure is described below in conjunction with FIG. 2. Method 200 may be performed at object management device 110 in FIG. 1 and/or any suitable computing device.

At block 202, object management device 110 detects operation parameters of at least two of a plurality of objects. As illustrated in FIG. 1, the plurality of objects (e.g., virtual machines) in the data management system may be distributed across different computing nodes. Object management device 110 may detect operation parameters of some (e.g., at least two) or all of the plurality of objects depending on the actual requirements. The operation parameters indicate parameters or operational indicators for the operation of objects on corresponding computing nodes. For example, the operation parameters may include at least a communication connection value indicating a state of connection between an object and other objects and the traffic of communication between an object and other objects, and/or a resource utilization rate of the utilization of operation resources in a computing node by an object, and the utilized operation resources may include, but are not limited to, one or more of processor resources, memory resources, and virtual disk resources.

In some embodiments, object management device 110 may obtain the operation parameters of objects through detection operations of other detection devices. In some embodiments, object management device 110 may also obtain the operation parameters of objects by detecting the operation of the objects. The present disclosure is not limited with respect to the detection of the operation parameters of objects.

At block 204, object management device 110 determines a rate of correlation between the at least two objects based on the detected operation parameters, wherein the rate of correlation indicates a degree of correlation between the at least two objects.

In one embodiment, in the case where the operation parameters include the traffic of each of the at least two objects in a predetermined time interval and a communication connection value indicating a state of connection between the at least two objects, object management device 110 may determine a rate of correlation between the objects based on the traffic and the communication connection value. In another embodiment, the operation parameters may also include at least one resource utilization rate of the utilization of at least one of the operation resources by each of the at least two objects, in which case object management device 110 may determine the rate of correlation between the objects based on the traffic, the communication connection value, and the resource utilization rate. Specific implementations for determining the rate of correlation between objects will be described in detail below.

At block 206, object management device 110 compares the determined rate of correlation with a predetermined threshold. Here, the predetermined threshold may be predetermined based on specific grouping requirements, and the present disclosure does not limit the specific value of the predetermined threshold. Object management device 110 may determine, for each pair of objects in the at least two objects, a rate of correlation between the objects based on the implementation in step 204, and compare the determined rate of correlation with the predetermined threshold.

At block 208, object management device 110 determines, based on the comparison of the determined rate of correlation with the predetermined threshold, grouping of the at least two objects. For example, object management device 110 may group together a pair of objects with the rate of correlation not less than the predetermined threshold and not place objects with the rate of correlation less than the predetermined threshold into the same group.

Specific implementations for determining the rate of correlation between objects will be described in detail below.

In one embodiment, the operation parameters include the traffic of each of the at least two objects in a predetermined time interval and a communication connection value indicating a state of connection between the at least two objects. The traffic may be used to indicate the traffic of communication between each object and other objects during the predetermined time interval (e.g., 12 seconds or other time intervals) (e.g., the traffic sent by the object to other objects and the traffic received from the other objects). In one embodiment, after further processing, the traffic may be expressed as an integer value, which is convenient for subsequent calculation. The communication connection value indicates the state of connection between two objects in a predetermined time interval. In one embodiment, the communication connection value at a time point may be represented by means of binarization. For example, a communication connection value of 1 indicates a connected state between two objects at that time point; and a communication connection value of 0 indicates an unconnected state between the two objects at that time point.

Figure 3:
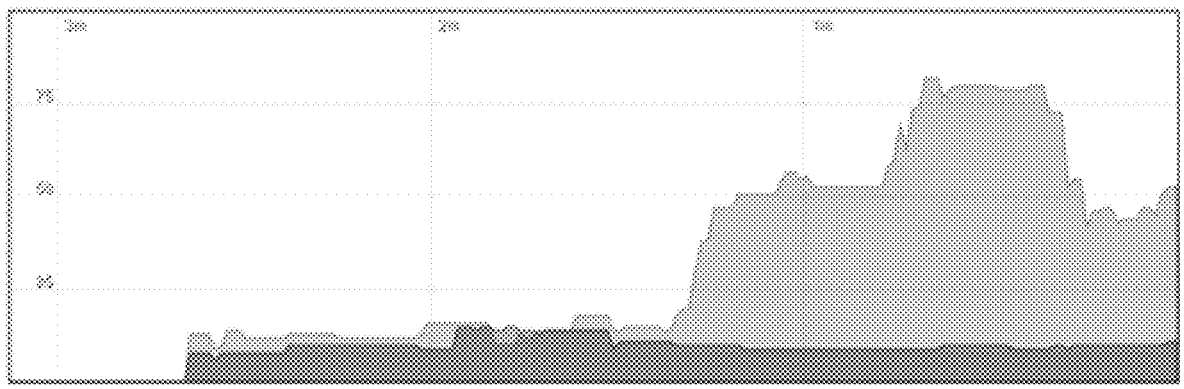
FIG. 3 illustrates an example schematic diagram of the status of network communication of objects in a period of time.

In some embodiments, the status of network communication between objects may be acquired through existing network monitoring tools or those to be developed in the future, including parameter information such as the source port, destination port, transmission rate, and traffic of the network communication. As shown in FIG. 3, a schematic diagram of obtaining the traffic of communication between two objects using an existing network monitoring tool is illustrated. In FIG. 3, the network traffic of two objects over a period of 3 minutes is illustrated. Here, the light gray area indicates the traffic $T_A$ of communication between the two objects via UDP; and the dark gray area indicates the traffic $T_B$ of communication between the two objects via TCP. The traffic T of communication between the two objects in 3 minutes may be the total sum of $T_A$ and $T_B$.

It should be understood that the example in FIG. 3 is only schematic. It will be understood by those skilled in the art that various types of network monitoring tools may be employed to obtain the network communication status between the two objects. Accordingly, the schematic diagram of the network communication status is not limited to the schematic diagram in FIG. 3.

Similarly, object management device 110 may obtain the traffic between a plurality of devices in a predetermined time interval. For example, illustration is given by taking 7 objects (object A, object B, object C, object D, object E, object F, and object G) as an example, where object management device 110 may acquire the traffic between these 7 objects in a predetermined time interval. Further, based on the acquired traffic between the 7 objects, object management device 110 may obtain the traffic of each object in the predetermined time interval, that is, the sum of the traffic of communication between that object and the other 6 objects in the predetermined time interval.

In addition, object device manager 110 may determine, based on the traffic between objects, whether the objects are connected, and thus determine the communication connection value. That is, if there is traffic between two objects, then object management device 110 determines that the two objects are connected, and accordingly, the communication connection value for the two objects is 1; on the contrary, if there is no traffic between two objects, then object management device 110 determines that the two objects are not connected, and accordingly, the communication connection value for the two objects is 0.

Therefore, in the case where the operation parameters include the traffic of each of the at least two objects in a predetermined time interval and a communication connection value indicating a state of connection between the at least two objects, object management device 110 determines a rate of correlation between the at least two objects based on the detected operation parameters, including: determining, by object management device 110, the rate of correlation between the at least two objects based on the traffic of each of the at least two objects and the communication connection value indicating the state of connection between the at least two objects.

A specific implementation of determining a rate of correlation between at least two objects based on the traffic of each of the at least two objects and a communication connection value indicating a state of connection between the at least two objects will be described in detail below in connection with FIG. 4 using two objects A and B as an example.

Figure 4:
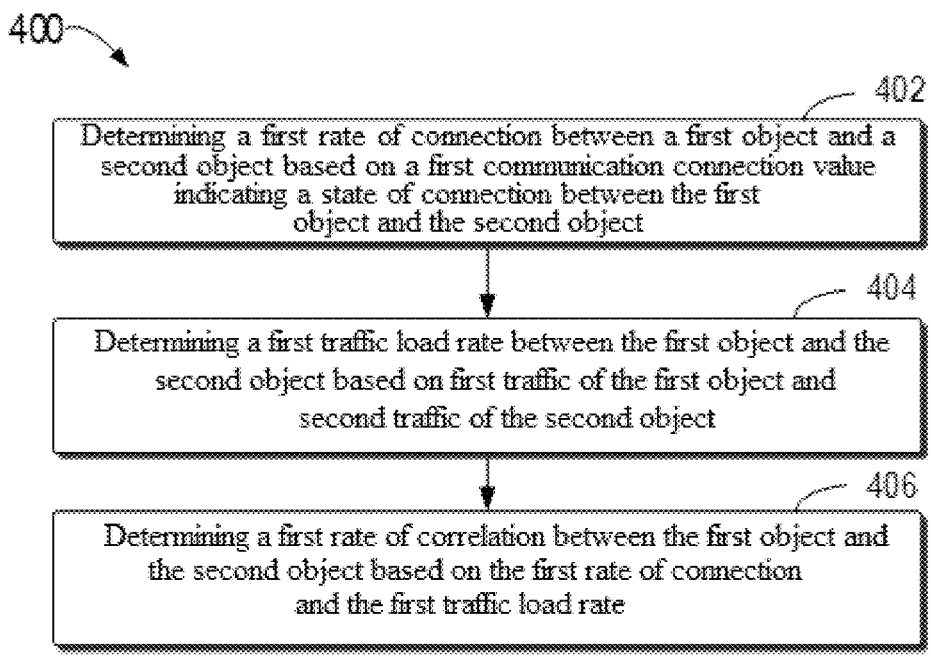
FIG. 4 illustrates flow chart 400 of a method for determining a rate of correlation between a first object and a second object according to an embodiment of the present disclosure.

FIG. 4 illustrates a flow chart of a method for determining a rate of correlation between at least two objects based on operation parameters according to an embodiment of the present disclosure. It should be understood that FIG. 4 does not limit the order of the steps.

At block 402, object management device 110 determines a first rate of connection between first object A and second object B based on a first communication connection value indicating a state of connection between first object A and second object B.

Specifically, object management device 110 may, based on the acquired status of network communication between object A and object B, obtain: first communication connection value $C_{AB}$ (denoted by connected (A, B)) indicating the state of connection between object A and object B in a predetermined time interval; traffic $T_A$ of object A (denoted by traffic (A)) in the predetermined time interval; traffic $T_B$ of object B (denoted by traffic (B)) in the predetermined time interval; and traffic $T_{AB}$ between objects A and B (denoted by traffic (A, B)) in the predetermined time interval.

When determining first rate of connection C(A, B) between first object A and second object B based on first communication connection value $C_{AB}$ indicating the state of connection between first object A and second object B, object management device 110 may determine an average communication connection value of first communication connection values $C_{AB}$ in the predetermined time interval and determine this average communication connection value as the first rate of connection.

Object management device 110 may determine the average communication connection value, i.e., the first rate of connection, based on the following Equation (1).

$$C(A, B) = \frac{1}{n} C_{AB} = \frac{1}{n} \sum_{i=0}^{n} connected_i(A, B) \qquad \text{Equation (1)}$$

where n denotes the number of unit times included in the predetermined time interval; i denotes the ith unit time; and connectedi (A, B) denotes the connection value between object A and object B at the ith unit time, i.e., whether object A and object B are connected at the ith unit time.

The C(A, B) calculated according to Equation (1) is the average communication connection value between object A and object B in that predetermined time interval, and this average communication connection value may be determined as the first rate of connection indicating the state of connection between object A and object B.

Figure 5:
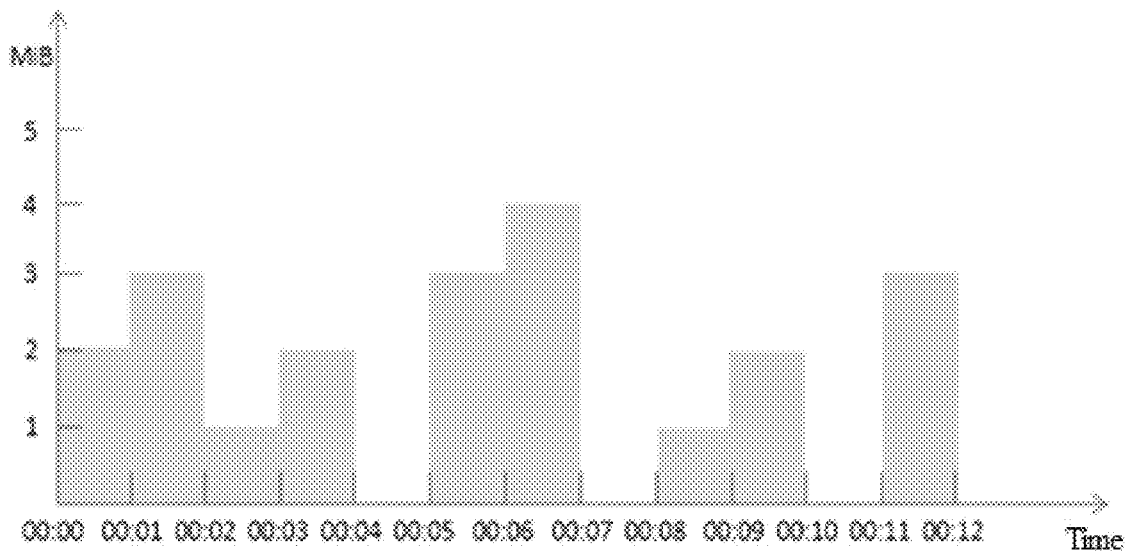
FIG. 5 illustrates a schematic diagram of the status of communication connection between a first object and a second object.

Hereinafter, an example implementation of determining the first rate of connection indicating the state of connection between object A and object B is illustrated in connection with specific examples. FIG. 5 schematically illustrates a histogram of the traffic of communication between object A and object B in a predetermined time interval (e.g., 12 seconds; with unit time in seconds). In FIG. 5, the predetermined time interval is 12 seconds, and it can be understood that other time intervals may also be used depending on the operation status and practical needs of the system, which is not limited in the present disclosure.

As shown in FIG. 5, the horizontal coordinates of the schematic diagram in FIG. 5 indicate time, where the predetermined time interval is 12 seconds, with unit time in seconds; and the vertical coordinates indicate the traffic of communication between object A and object B. For example, object A and object B are connected at the 1st second, the corresponding communication connection value is 1, and, as can be seen from FIG. 5, the traffic between object A and object B at the 1st second is 2.

According to the schematic diagram in FIG. 5, it can be seen that object A and object B are not connected at the time points of the 5th, 8th, and 11th second in the predetermined time interval, the corresponding communication connection values at the corresponding time points are 0, and the communication connection values at the remaining time points are 1.

Thus, according to the above Equation (1), it may be calculated that $$C(A, B) = \frac{1}{12} * 9 = 0.75.$$

The implementation for generating a first traffic load rate will be subsequently described below. Returning to FIG. 4, at block 404, object management device 110 determines a first traffic load rate between the first object and the second object based on first traffic of the first object and second traffic of the second object.

Specifically, object management device 110 acquires third traffic $T_{AB}$ of communication between first object A and second object B (denoted by Traffic (A, B)) in that predetermined time interval. Object management device 110 further determines the sum $(T_A+T_B)$ of first traffic $T_A$ of object A (denoted by Traffic (A)) and second traffic $T_B$ of second object B (denoted by Traffic (B)) as total traffic $T_{total}$ of first object A and second object B. Object management device 110 determines first traffic load rate TL(A,B) based on a ratio of third traffic $T_{AB}$ to total traffic $T_{total}$, which is specifically expressed as Equation (2):

Equation (2)

$$TL(A, B) = \frac{2 Traffic(A, B)}{T_A + T_B} = \frac{2\sum_{i=0}^{n} traffic_i(A, B)}{\sum_{i=0}^{n}(traffic_i(A) + traffic_i(B))}$$

where n denotes the number of unit times included in the predetermined time interval; i denotes the ith unit time; and traffic$_i$(A,B) denotes the traffic of communication between object A and object B at the ith unit time, traffic$_i$(A) denotes the traffic of object A at the ith unit time, traffic$_i$(B) denotes the traffic of object B at the ith unit time, and TL(A,B) denotes the first traffic load rate between object A and object B in the predetermined time interval.

Next, the example in FIG. 5 will still be taken as an example for illustration. In FIG. 5, it is possible to acquire the traffic of communication between object A and object B at each unit time, and accordingly, third traffic $T_{AB}$ of communication between first object A and second object B in the predetermined time interval of 12 seconds is 21. Assume that object management device 110 has acquired the sum $(T_A+T_B)$ of first traffic $T_A$ of object A and second traffic $T_B$ of second object B, for example, 84. In combination with the above Equation (2), it can be determined that $$TL(A, B) = \frac{2 * 21}{84} = 0.5.$$

That is, the first traffic load rate between the first object and the second object is 0.5.

Returning again to FIG. 4, at block 406, object management device 110 determines a first rate of correlation between the first object and the second object based on the first rate of connection and the first traffic load rate.

Specifically, object management device 110 may determine rate of correlation R1 (A,B) between the first object and the second object based on a first weight, a second weight, the first rate of connection, and the first traffic load rate. In one embodiment, the sum of the first weight and the second weight is 1. Specifically, the process of determining rate of correlation R1 (A,B) may be expressed in Equation (3):

$$R1(A,B)=C(A,B)*W1+TL(A,B)*W2+V3 \qquad \text{Equation (3)}$$

where C(A,B) denotes the first rate of connection between object A and object B in the predetermined time interval, TL(A,B) denotes the first traffic load rate between object A and object B in the predetermined time interval, W1 and W2 are the first and second weights, respectively, and W1+W2=1. In addition, V3 is a predefined parameter which is a constant and is used to set rate of correlation R1 (A,B) in any desired range of values. The setting of V3 may be defined according to the system requirements, which is not limited in the present disclosure. The values of the first weight and the second weight are determined according to the grouping requirements. For example, if the objects in groups are expected to focus more on communication connection relationships, first weight W1 may be set higher than second weight W2; and if the objects in groups are expected to focus more on the correlation of the traffic, second weight W2 may be set larger than first weight W1.

In addition, furthermore, in order to make the grouping more accurate, auxiliary parameters may be considered in the process of grouping. For example, with respect to communication connections at one or more specific ports, considering that the communication status of these ports is irrelevant to grouping, the traffic between an object and that one or more specific ports may be disregarded in the calculation of the traffic, so that the above Equation (2) may be modified as follows:

Equation (4)

$$TL(A, B) =$$

$$\frac{2 Traffic(A, B)}{T_A + T_B - T0} = \frac{2\sum_{i=0}^{n} traffic_i(A, B)}{\sum_{i=0}^{n}(traffic_i(A) + traffic_i(B)) - T0}$$

where T0 is the sum of the traffic between object A and the one or more specific ports and the traffic between object B and the one or more specific ports.

Further, in some embodiments, in order to make the correlation between objects that are grouped together be closer, in addition to the traffic of each of the at least two objects in the predetermined time interval and the communication connection value indicating the state of connection between the at least two objects, the operation parameters may further include at least one resource utilization rate of the utilization of at least one of the operation resources by each of the at least two objects.

The objects operate on corresponding computing nodes, and the computing nodes include operation resources that include at least one of processor resources, memory resources, and virtual disk resources. Accordingly, according to another implementation of the embodiment of the present disclosure, the operation parameters may include at least one resource utilization rate of the utilization of at least one of the operation resources by each of the at least two objects.

In some embodiments, the object management device may employ existing or future monitoring devices to acquire the usage of the operation resources by the objects, which is expressed, for example, by the resource utilization rate.

Figure 6A:
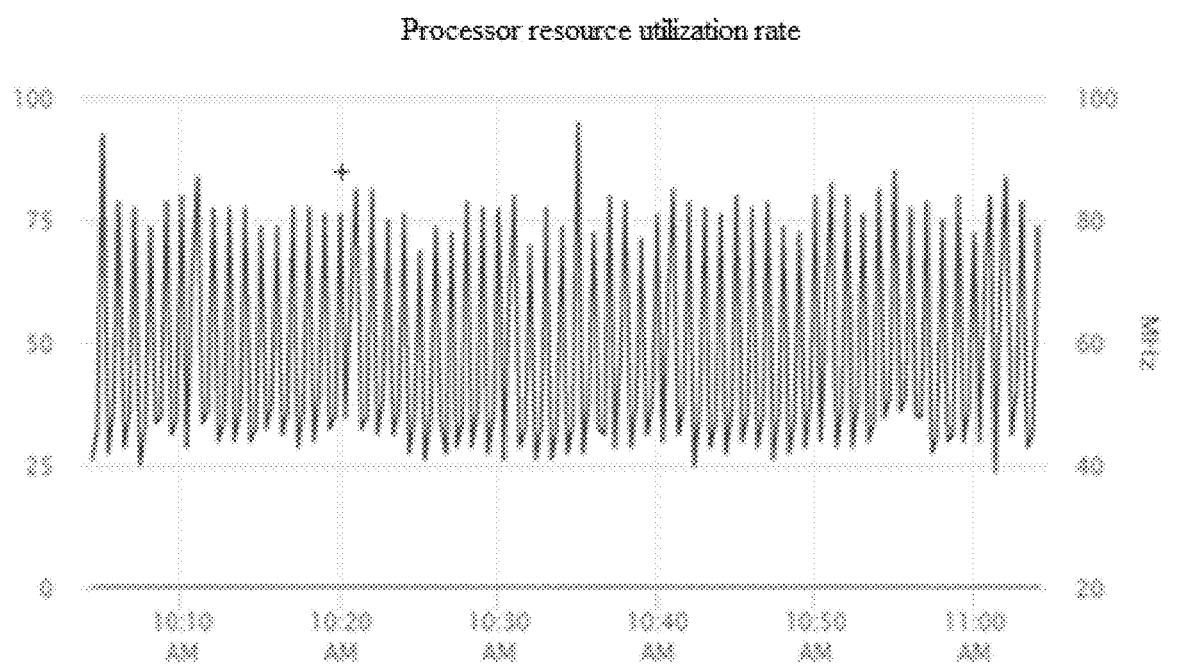
FIGS. 6A-6C illustrate schematic diagrams of resource utilization rates of various different types of resources by objects in the data management system.
Figure 6B:
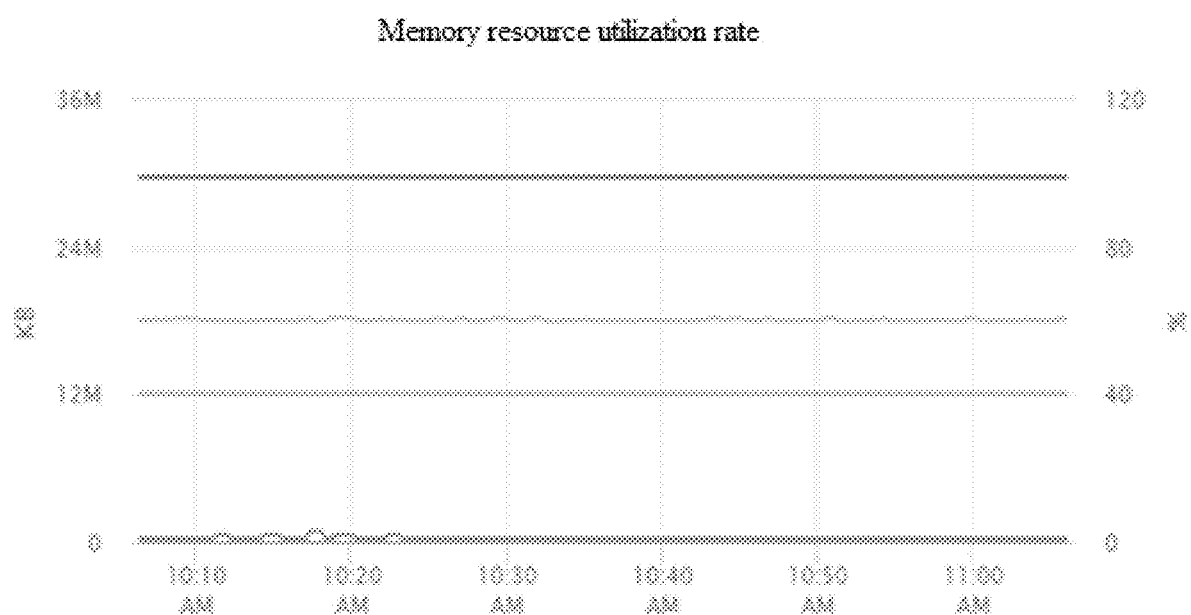
Figure 6C:
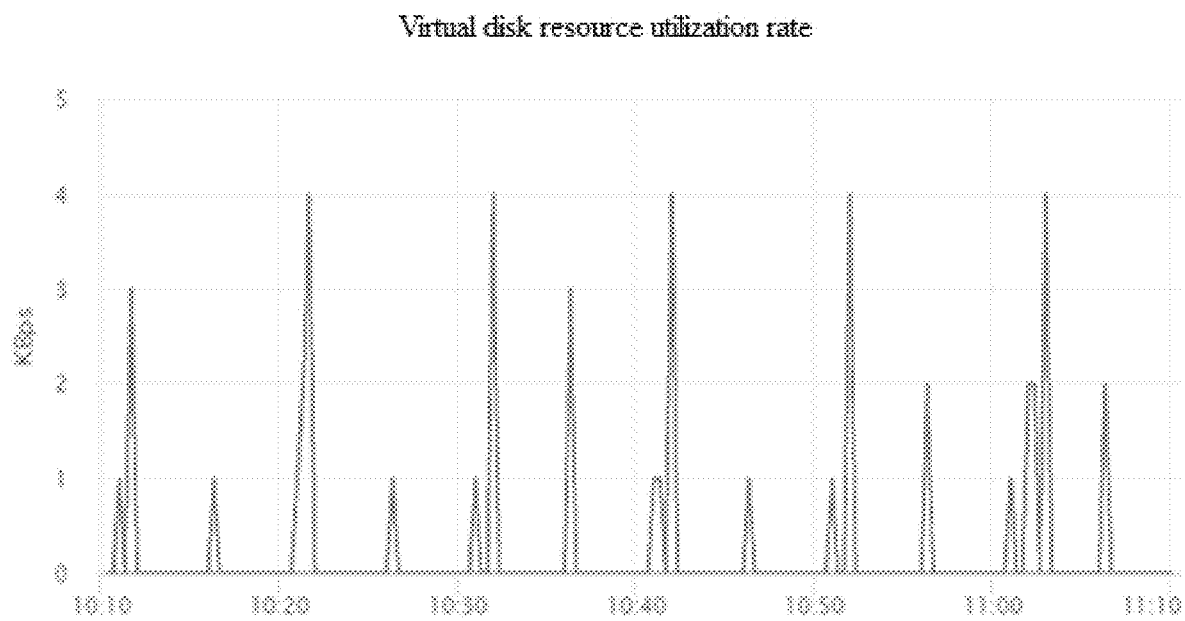

FIGS. 6A to 6C illustrate schematic diagrams of utilization rates of manager resources, memory resources, and virtual disk resources by objects, respectively. It should be understood that FIGS. 6A to 6C are merely schematic and are not intended to limit the present disclosure.

Accordingly, object management device 110 may also determine the first rate of correlation in combination with the resource utilization rates. Hereinafter, an implementation of the step of determining, by object management device 110, the first rate of correlation between the first object and the second object based on the first rate of connection, the first traffic load rate, and the resource utilization rate will be described in conjunction with FIG. 7.

Figure 7:
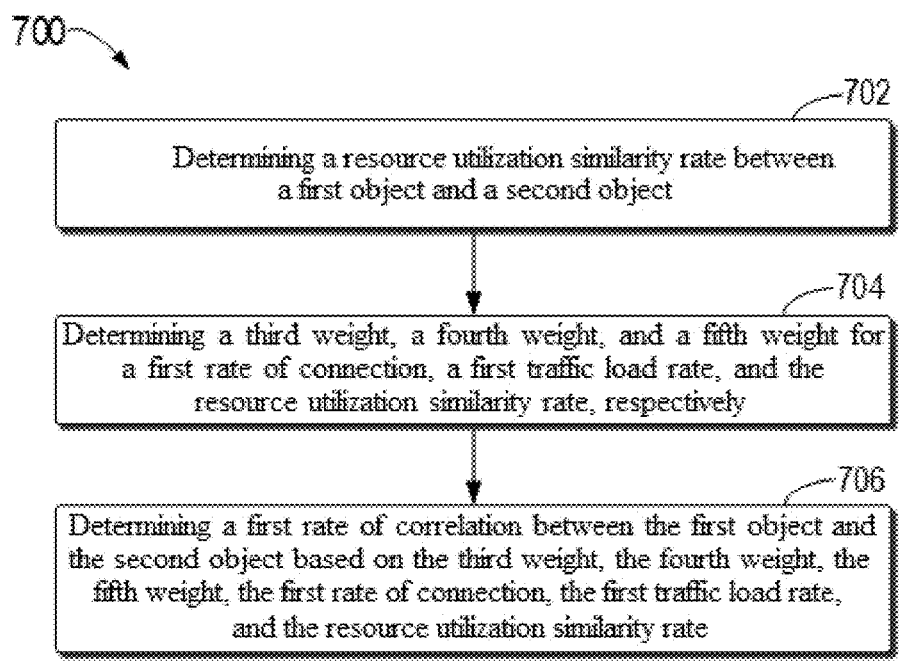
FIG. 7 illustrates flow chart 700 of a method for determining a rate of correlation between a first object and a second object according to an embodiment of the present disclosure.

FIG. 7 illustrates a flow chart of method 700 for determining a first rate of correlation between a first object and a second object based on a first rate of connection and a first traffic rate according to an embodiment of the present disclosure. It should be understood that FIG. 7 does not limit the order of the steps.

As shown in FIG. 7, at block 702, object management device 110 determines a resource utilization similarity rate between the first object and the second object, where the resource utilization similarity rate indicates a similar rate of utilization of the same type of operation resources by the first object and the second object. Typically, the higher the similarity rate is, the more consistent the operation between the first object and the second object is. For example, if the processor resource utilization similarity rate is large, it indicates the similarity between the first object and the second object with respect to processor resource utilization is greater, which indicates that the possibility that the first object and the second object are in the same application is greater.

At block 704, object management device 110 determines a third weight, a fourth weight, and a fifth weight for the first rate of connection, the first traffic load rate, and the resource utilization rate, respectively. Here, the sum of the third weight, the fourth weight, and the fifth weight is 1. In addition, first rate of connection C(A,B) and first traffic load rate TL(A,B) have been described above in conjunction with specific implementations and will not be repeated here.

At block 706, object management device 110 determines the first rate of correlation between the first object and the second object based on the third weight, the fourth weight, the fifth weight, the first rate of connection, the first traffic load rate, and the first resource utilization rate.

For example, first rate of correlation R2 (A,B) may be determined by the following Equation (5):

$R2(A,B)=C(A,B)*w1+TL(A,B)*w2+LDR(A,B)*w3+v4$  Equation(5)

where C(A,B) is the first rate of connection, TL(A,B) is the first traffic load rate, LDR(A,B) is the first resource utilization similarity rate (for which the specific determination method will be described below) between object A and object B, and the weights w1+w2+w3=1. Here, v4 is a predetermined constant value for setting first rate of correlation R2 (A,B) within a predetermined range of values, and the present disclosure does not limit the manner of determining v4 or the specific value of v4.

In some embodiments, when determining the first resource utilization similarity rate between first object A and second object B, object management device 110 may perform a similar method for determining the resource utilization similarity rate for each of the utilized resources in the operation resources, and a flow chart of the method for determining the resource utilization similarity rate will be described below in connection with FIG. 8.

Figure 8:
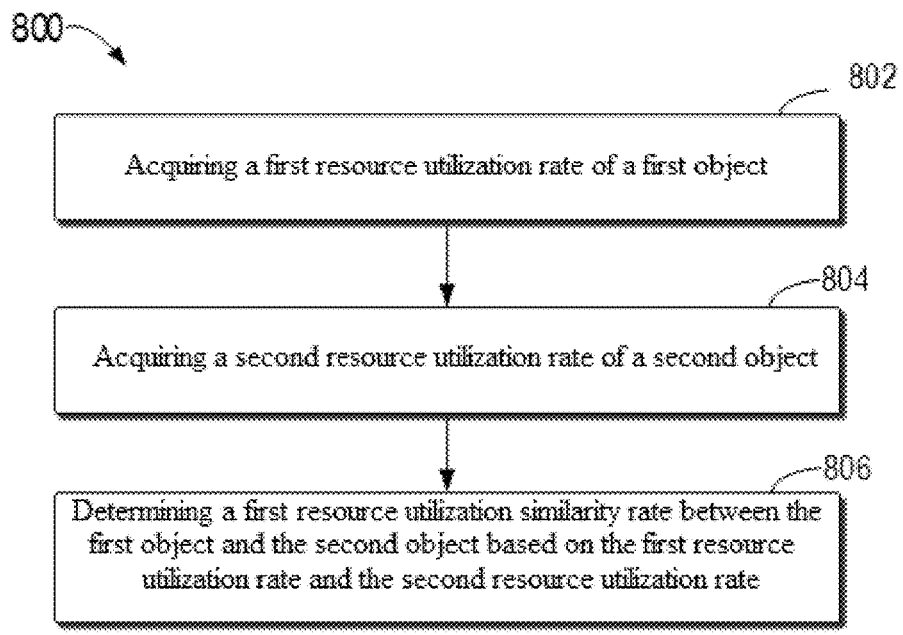
FIG. 8 illustrates flow chart 800 of a method for determining a resource utilization similarity rate between a first object and a second object according to an embodiment of the present disclosure.

FIG. 8 is a flow chart of method 800 for determining a resource utilization similarity rate between objects according to an embodiment of the present disclosure.

In FIG. 8, at block 802, object management device 110 acquires first resource utilization rate U1 of first object A. First resource utilization rate U1 indicates the utilization rate of a certain operation resource by object A. At block 804, object management device 110 acquires second resource utilization rate U2 of second object B. Second resource utilization rate U2 indicates the utilization rate of that operation resource by object B. At block 806, object management device 110 determines a first resource utilization similarity rate between first object A and second object B based on first resource utilization rate U1 and second resource utilization rate U2.

Figure 9:
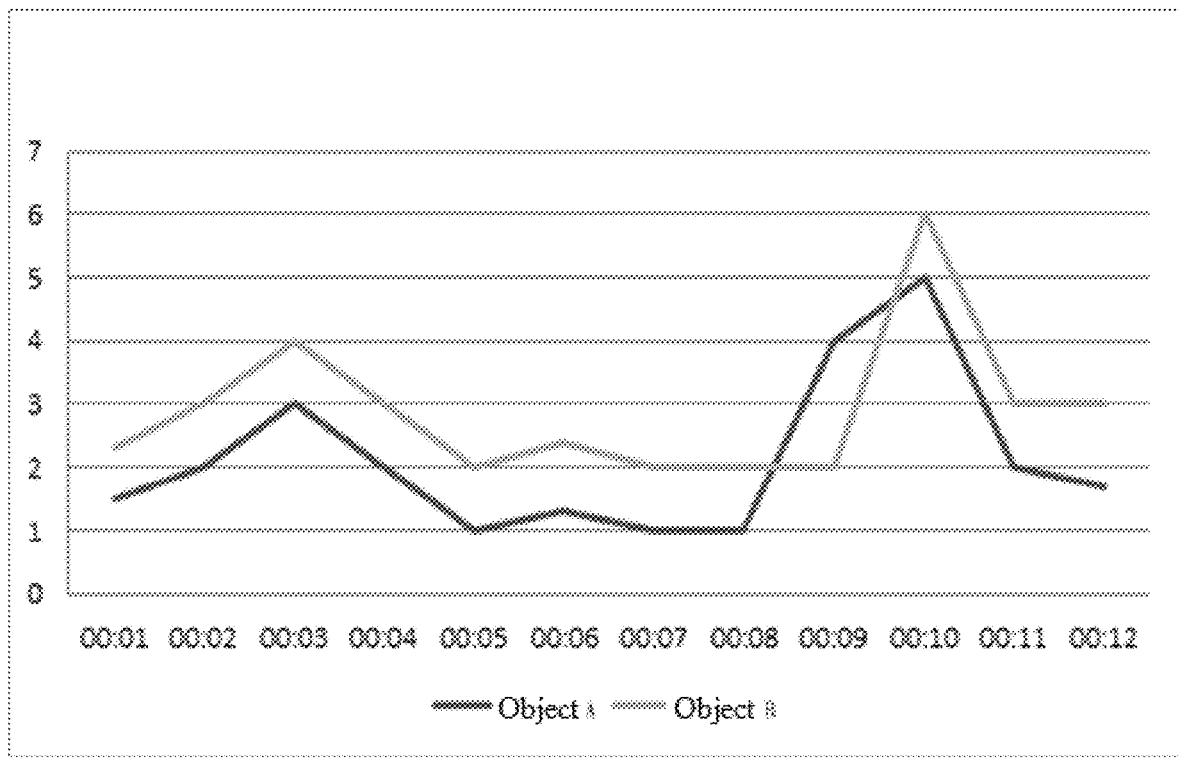
FIG. 9 illustrates an operation resource utilization rate curve graph corresponding to operation resource utilization rates of a first object and a second object.

Specifically, object management device 110 may construct a first resource utilization rate curve and a second resource utilization rate curve when determining the resource utilization similarity rate between first object A and second object B, where the first resource utilization rate curve and the second resource utilization rate curve correspond to first resource utilization rate U1 and second resource utilization rate U2, respectively. For example, FIG. 9 illustrates schematic resource utilization rate curves. Further, object management device 110 acquires Euclidean distance D(A,B) between the two resource utilization rate curves. Object management device 110 may calculate Euclidean distance D(A,B) between the two resource utilization rate curves based on Equation (6).

$$D(A, B) = \frac{1}{n}\sum_{i=0}^{n}\sqrt{(A_i - B_i)^2}$$  Equation (6)

where n is the number of unit times included in the predetermined time interval, and Ai and Bi are the resource utilization rates of resource utilization by object A and object B at the ith unit time, respectively.

Then, object management device 110 performs inverse distance processing on acquired Euclidean distance D(A,B) and uses the processed result as the resource utilization similarity rate between object A and object B for that operation resource. Object management device 110 may perform inverse distance processing on acquired Euclidean distance D(A,B) according to the following Equation (7).

$$DR(A, B) = \frac{1}{n}\sum_{i=0}^{n}\left(1 - \frac{\sqrt{(A_i - B_i)^2}}{A_i + B_i}\right)$$

Equation (7)

where n is the number of unit times included in the predetermined time interval, and Ai and Bi are the resource utilization rates of object A and object B at the ith unit time, respectively. Accordingly, DR(A,B) is determined as the first resource utilization similarity rate between object A and object B for one kind of operation resources.

Similarly, for each kind of operation resources utilized by object A and object B, object management device 110 may perform method process 800 as in FIG. 8 to determine corresponding first resource utilization similarity rate DR(A, B).

When object management device 110 has determined corresponding first resource utilization similarity rate DR(A, B) for each kind of utilized operation resources, object management device 110 determines the corresponding weight for each of the acquired first resource utilization similarity rates DR(A,B). Then, object management device 110 determines the first resource utilization similarity rate between objects A and B based on the obtained weights and corresponding first resource utilization similarity rates DR(A,B). In one embodiment, the object management device may determine the rate of correlation based on the following Equation (8).

$$LDR(A,B)=DR_{cpu}(A,B)*wc+DR_{mem}(A,B)*wm+DR_{disk}(A,B)*wd+v$$

Equation (8)

where $DR_{cpu}(A,B)$ denotes the first resource utilization similarity rate between objects A and B for the utilization of processor resources; $DR_{mem}(A, B)$ denotes the first resource utilization similarity rate between objects A and B for the utilization of memory resources; $DR_{disk}(A, B)$ denotes the first resource utilization similarity rate between objects A and B for the utilization of virtual disk resources; v is a predefined value that is used to set the rate of correlation LDR(A,B) within a predefined range of data; and wc, wm, and wd are corresponding weights, and wc+wm+wd=1.

In the foregoing, two implementations for determining the rate of correlation are described in conjunction with FIGS. 3 to 8, namely, determining first rate of correlation R1 (A,B) based on the traffic of each of at least two objects in a predetermined time interval and a communication connection value indicating the state of connection between the at least two objects; and determining first rate of correlation R2(A,B) based on the traffic of each of at least two objects in a predetermined time interval, a communication connection value indicating the state of connection between the at least two objects, and at least one resource utilization rate of the utilization of at least one of operation resources by each of the at least two objects. Moreover, grouping based on rate of correlation R2 (A,B) allows for closer correlation between objects that are grouped together, which is more conducive to efficient batch processing and, more powerfully, maximization of data consistency in the process of data protection and restoration.

Figure 2:
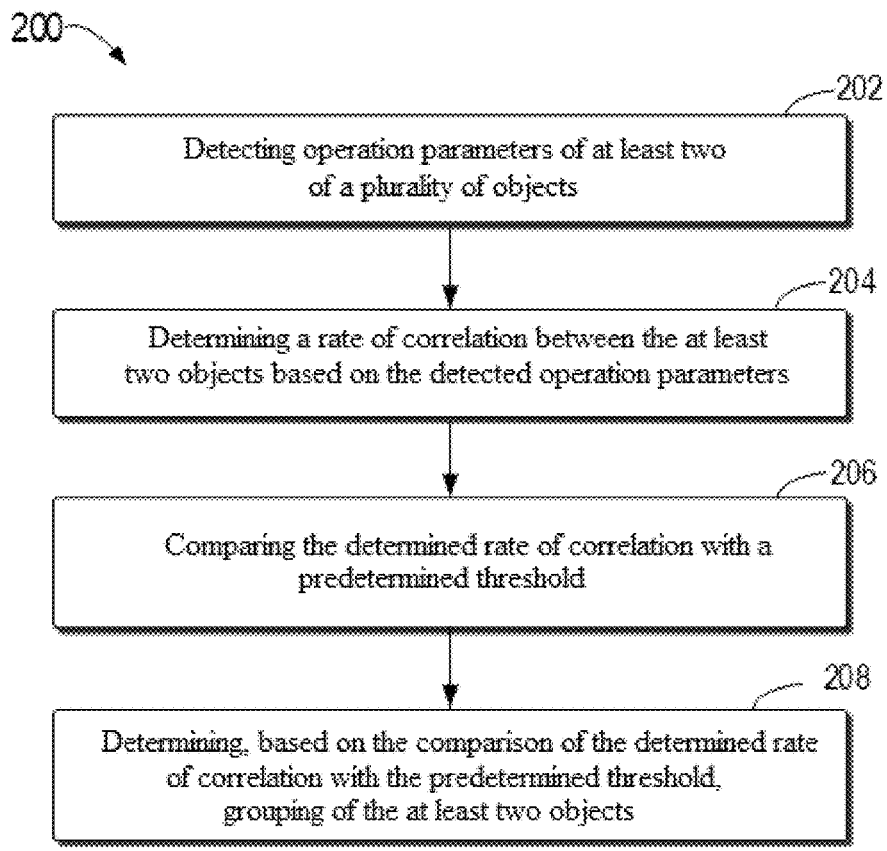
FIG. 2 illustrates a flow chart of method 200 for grouping objects in a data processing system according to an embodiment of the present disclosure.

The operation of grouping objects based on the rate of correlation will be described in detail below. Referring to FIG. 2, in FIG. 2, at block 206, object management device 110 compares the determined rate of correlation with a predetermined threshold. Here, the predetermined threshold may be predetermined based on specific grouping requirements, and the present disclosure does not limit the specific value of the predetermined threshold. The object management device may determine, for each pair of objects in the at least two objects, a rate of correlation between the objects based on the approach in step 204, and compare the determined rate of correlation with the predetermined threshold.

At block 208, object management device 110 determines, based on the comparison of the determined rate of correlation with the predetermined threshold, whether to group the at least two objects together. Object management device 110 groups a pair of objects with the rate of correlation not less than the predetermined threshold together; and does not place objects with the rate of correlation less than the predetermined threshold into the same group.

According to an embodiment of the present disclosure, in object grouping method 200, before comparing the rate of correlation with the predetermined threshold, object management device 110 may construct a topological graph based on the determined rate of correlation, where the nodes in the topological graph represent the at least two objects, respectively, and the connection lines between the nodes represent rates of correlation between corresponding objects. The construction of the topological graph will be illustrated below schematically with R1 (A,B) and R2 (A,B) as examples, respectively, and it will be illustrated schematically that the correlation between objects in the groups determined through R2 (A,B) is greater.

In one embodiment, in the case where first rate of correlation R1 (A,B) is determined based on the traffic of each of the at least two objects in a predetermined time interval and the communication connection value indicating the state of connection between the at least two objects in the operation parameters, the example in FIG. 5 will still be taken as an example for illustration. Object management device 110 may establish a matrix based on the acquired correlation between each two objects, as shown in Table 1 below (taking 7 objects as an example, namely, object A, object B, object C, object D, object E, object F, and object G).

TABLE 1

| Object | A | B | C | D | E | F | G |
|---|---|---|---|---|---|---|---|
| A | 0 | 0.625 | 0.3 | 0 | 0 | 0 | 0 |
| B | 0.625 | 0 | 0.8 | 0 | 0 | 0 | 0 |
| C | 0.3 | 0.8 | 0 | 0.2 | 0 | 0 | 0 |
| D | 0 | 0 | 0.2 | 0 | 0.01 | 0 | 0 |
| E | 0 | 0 | 0 | 0.01 | 0 | 0.2 | 0.6 |
| F | 0 | 0 | 0 | 0 | 0.2 | 0 | 0 |
| G | 0 | 0 | 0 | 0 | 0.6 | 0 | 0 |

After establishing the above Table 1, object management device 110 constructs topological graph 910 based on the established Table 1, as shown in FIG. 9A. In topological graph 910, there are 7 nodes which represent object A to object G, respectively, and the connection lines between the nodes indicate the rates of correlation between corresponding objects. For example, as shown in FIG. 9A, the connection line between nodes A and B indicates that the rate of correlation between objects A and B is 0.625. Moreover, the thickness of a connection line between nodes in this topological graph is proportional to the rate of correlation between the nodes. For example, compared with the connection line between nodes A and B, the connection line between nodes B and C is thicker, which indicates that the rate of correlation between nodes B and C is greater.

Figure 10A:
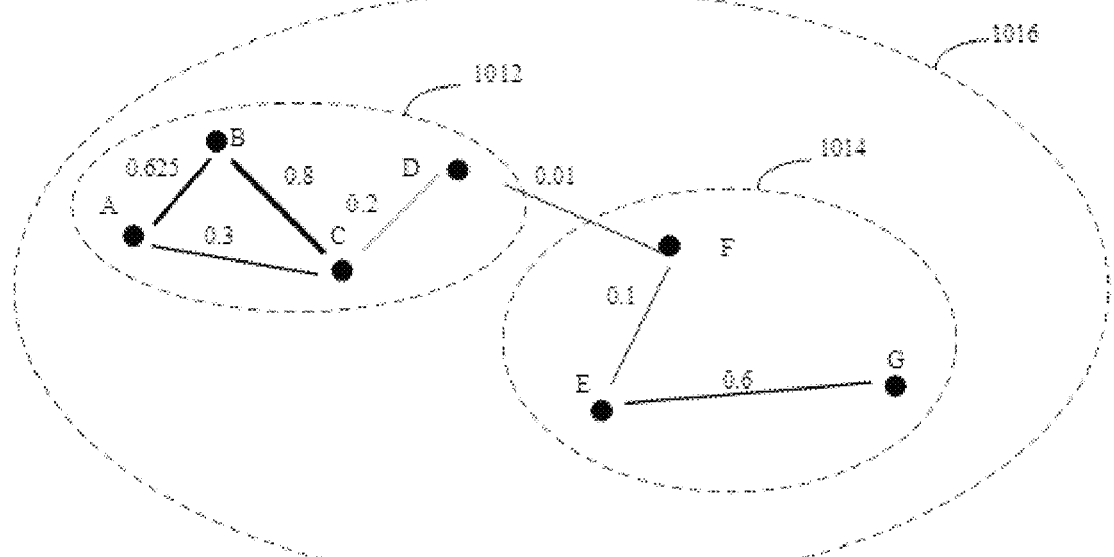
FIGS. 10A-10B illustrate examples of the topological graph constructed according to embodiments of the present disclosure.

Based on the rates of correlation indicated by the connection lines in the topological graph, object management device 110 compares the rates of correlation with a predetermined threshold and, based on the comparison results, determines grouping of the objects in the topological graph. For example, as shown in FIG. 10A, assuming that the predetermined threshold is 0.05, and thus the rate of correlation between nodes D and E is 0.01, which is less than this predetermined threshold. Therefore, object management device 110 determines that it is possible not to group objects D and E together. Object management device 110 performs similar grouping operations until the grouping operation is completed for all nodes in the topological graph. For example, in graph 1010, object A, object B, object C, and object D are grouped together (denoted by dashed circle 1012), and object E, object F, and object G are grouped together (denoted by dashed circle 1014). Of course, since object A-object G are in the same object management system, object A-object G also belong to that system (denoted by dashed circle 1016).

Similarly, in the case where first rate of correlation R2 (A,B) is determined based on the traffic of each of the at least two objects in a predetermined time interval, the communication connection value indicating the state of connection between the at least two objects, and at least one resource utilization rate of the utilization of at least one of operation resources by each of the at least two objects in the operation parameters, the reference values in the above example will still be taken as an example for illustration. Object management device 110 may establish a matrix based on the acquired correlation between each two objects, as shown in Table 1 below (taking 7 objects as an example, namely, object A, object B, object C, object D, object E, object F, and object G).

TABLE 2

| Object | A | B | C | D | E | F | G |
|---|---|---|---|---|---|---|---|
| A | 0 | 0.8 | 0.4 | 0 | 0 | 0 | 0 |
| B | 0.8 | 0 | 0.9 | 0 | 0 | 0 | 0 |
| C | 0.4 | 0.9 | 0 | 0.4 | 0 | 0 | 0 |
| D | 0 | 0 | 0.4 | 0 | 0 | 0.012 | 0 |
| E | 0 | 0 | 0 | 0 | 0 | 0.2 | 0.8 |
| F | 0 | 0 | 0 | 0.012 | 0.2 | 0 | 0 |
| G | 0 | 0 | 0 | 0 | 0.8 | 0 | 0 |

Figure 10B:
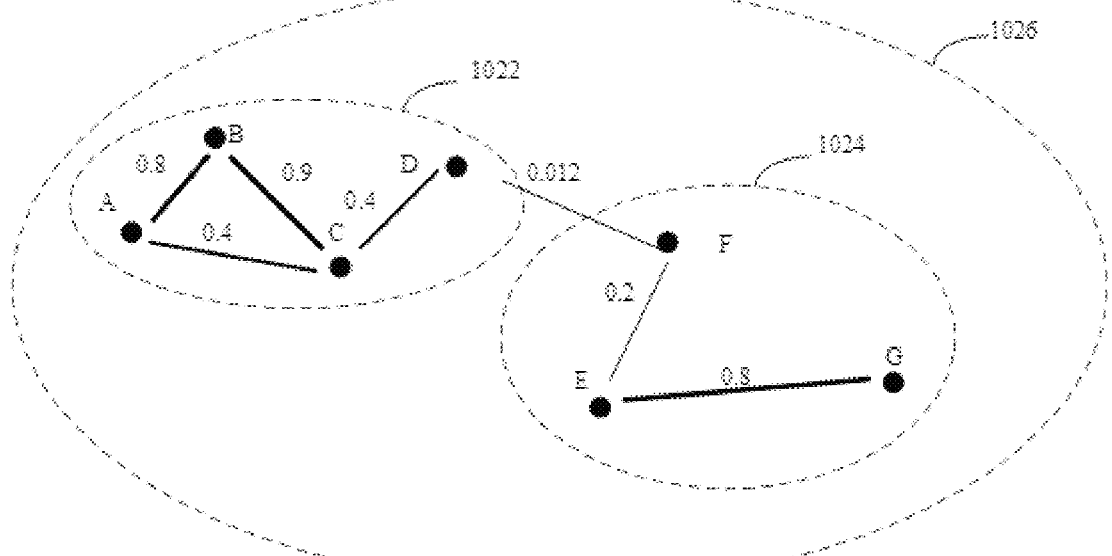

After establishing the above Table 2, object management device 110 constructs topological graph 1020 based on the established Table 2, as shown in FIG. 10B. In topological graph 1020, there are 7 nodes which represent object A to object G, respectively, and the connection lines between the nodes indicate the rates of correlation between corresponding objects. For example, as shown in FIG. 10B, the connection line between nodes A and B indicates that the rate of correlation between objects A and B is 0.8. Moreover, the thickness of a connection line between nodes in this topological graph is proportional to the rate of correlation between the nodes. For example, compared with the connection line between nodes A and B, the connection line between nodes B and C is thicker, which indicates that the rate of correlation between nodes B and C is greater.

Based on the rates of correlation indicated by the connection lines in the topological graph, object management device 110 compares the rates of correlation with a predetermined threshold and, based on the comparison results, determines grouping of the objects in the topological graph. For example, as shown in FIG. 10B, assuming that the predetermined threshold is 0.05, and thus the rate of correlation between nodes D and E is 0.012, which is less than this predetermined threshold. Therefore, object management device 110 determines that it is possible not to group objects D and E together. Object management device 110 performs a similar grouping operation until the grouping operation is completed for all nodes in the topological graph. For example, in graph 1020, object A, object B, object C, and object D are grouped together (denoted by dashed circle 1022), and object E, object F, and object G are grouped together (denoted by dashed circle 1024). Of course, since object A-object G are in the same object management system, object A-object G also belong to that system (denoted by dashed circle 1026).

In addition, since the first rate of connection, the first traffic, and the resource utilization similarity rate are taken into account when calculating the rate of correlation in Table 2, a larger value of the rate of correlation is obtained, which indicates that the objects grouped together are more closely correlated with each other. This is because the resource utilization similarity rate is also taken into account when calculating the rate of correlation, and thus the robustness of such grouping is higher.

With this method, the data management system can automatically detect the degree of correlation between objects based on the operation status of the system and logically group objects with a high degree of correlation together according to the degrees of correlation between the objects, so that the user can manage objects in batches in an efficient manner during object management, thus improving the system performance. In particular, data consistency can be maximized in the process of data protection and restoration. In addition, the method may be automatically performed without manual operation by the user, thus improving the user-friendliness of the system and also enhancing the user experience.

Figure 11:
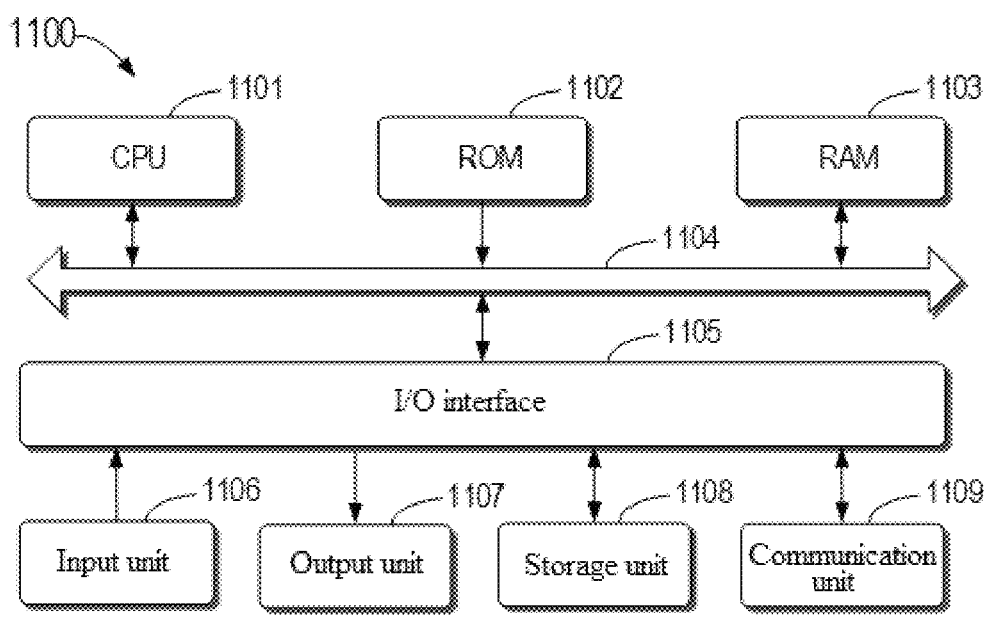
FIG. 11 illustrates a schematic block diagram of example device 1100 suitable for implementing embodiments of the present disclosure.

FIG. 11 illustrates a schematic block diagram of example device 1100 that may be used to implement embodiments of the present disclosure. Object management device 104 in FIG. 1 may be implemented using device 1100. As shown in the figure, device 1100 includes central processing unit (CPU) 1101 that can perform various appropriate actions and processing according to computer program instructions stored in read-only memory (ROM) 1102 or loaded from storage unit 1108 into random access memory (RAM) 1103. Various programs and data required for the operation of device 1100 may also be stored in RAM 1103. CPU 1101, ROM 1102, and RAM 1103 are connected to each other through bus 1104. Input/output (I/O) interface 1105 is also connected to bus 1104.

A plurality of components in device 1100 are connected to I/O interface 1105, including: input unit 1006, such as a keyboard and a mouse; output unit 1107, such as various types of displays and speakers; storage page 1108, such as a magnetic disk and an optical disc; and communication unit 1109, such as a network card, a modem, and a wireless communication transceiver. Communication unit 1109 allows device 1100 to exchange information/data with other devices through a computer network such as the Internet and/or various telecommunication networks.

The various processes and processing described above, such as method 200, process 700, and process 800, may be performed by processing unit 1001. For example, in some embodiments, method 200 and processes 700 and 800 may be implemented as computer software programs that are tangibly contained in a machine-readable medium, such as storage unit 1108. In some embodiments, part or all of the computer program may be loaded and/or mounted to device 1100 via ROM 1102 and/or communication unit 1109. When the computer program is loaded into RAM 1103 and executed by CPU 1101, one or more actions of method 200, process 700, and process 800 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for grouping objects in a data management system, comprising:
   detecting operation parameters of at least two objects of a plurality of objects operating on the data management system, wherein the operation parameters comprise traffic of each of the at least two objects in a predetermined time interval and a communication connection value indicating a state of a connection between the at least two objects;
   determining a rate of correlation between the at least two objects based on the detected operation parameters including based on the traffic of each of the objects and based on the communication connection value indicating a state of connection between the at least two objects, wherein the rate of correlation indicates a degree of correlation between the at least two objects, and wherein determining the rate of correlation between the at least two objects comprises determining a first rate of connection between a first object and a second object based on a first communication connection value indicating a state of connection between the first object and the second object, determining a first traffic load rate between the first object and the second object based on first traffic of the first object and second traffic of the second object, and determining, as the rate of correlation, a first rate of correlation between the first object and the second object based on the first rate of connection and the first traffic load rate;
   comparing the determined rate of correlation with a predetermined threshold; and
   determining, based on the comparison of the determined rate of correlation with the predetermined threshold, grouping of the at least two objects.

2. The method according to claim 1, further comprising:
   constructing a topological graph based on the determined rate of correlation, wherein nodes in the topological graph represent the at least two objects, respectively, and connection lines between the nodes represent rates of correlation between corresponding objects.

3. The method according to claim 1, wherein determining the first rate of connection between the first object and the second object based on the first communication connection value indicating the state of connection between the first object and the second object comprises:
   determining an average communication connection value of the first communication connection values in the predetermined time interval; and
   determining the average communication connection value as the first rate of connection.

4. The method according to claim 1, wherein determining the first traffic load rate between the first object and the second object based on the first traffic of the first object and the second traffic of the second object comprises:
   acquiring third traffic of communication between the first object and the second object in the predetermined time interval; and
   determining a sum of the first traffic and the second traffic as total traffic of the first object and the second object; and
   determining the first traffic load rate according to a ratio of the third traffic to the total traffic.

5. The method according to claim 1, wherein determining the first rate of correlation between the first object and the second object based on the first rate of connection and the first traffic load rate comprises:
   determining the first rate of correlation between the first object and the second object based on a first weight, a second weight, the first rate of connection, and the first traffic load rate,
   wherein a sum of the first weight and the second weight is 1.

6. The method according to claim 1, wherein the at least two objects operate on corresponding computing nodes in the data management system, the corresponding computing nodes comprising operation resources that comprise at least one of processor resources, memory resources, and virtual disk resources, and the operation parameters further comprise at least one resource utilization rate of a utilization of at least one of the operation resources by each of the at least two objects.

7. The method according to claim 6, wherein determining the first rate of correlation between the first object and the second object based on the first rate of connection and the first traffic load rate comprises:
   determining a resource utilization similarity rate between the first object and the second object;
   determining a third weight, a fourth weight, and a fifth weight for the first rate of connection, the first traffic load rate, and the resource utilization similarity rate, respectively;
   determining the first rate of correlation between the first object and the second object based on the third weight, the fourth weight, the fifth weight, and the corresponding first rate of connection, first traffic load rate, and resource utilization similarity rate,
   wherein a sum of the third weight, the fourth weight, and the fifth weight is 1.

8. The method according to claim 7, wherein determining the resource utilization similarity rate between the first object and the second object comprises:
   performing, for each of the at least one operation resource, the steps of:
   acquiring a first resource utilization rate for the first object;
   acquiring a second resource utilization rate for the second object; and
   determining a first resource utilization similarity rate between the first object and the second object based on the first resource utilization rate and the second resource utilization rate; and weighting the at least one determined first resource utilization similarity rate to obtain the resource utilization similarity rate between the first object and the second object.

9. The method according to claim 8, wherein determining the first resource utilization similarity rate between the first object and the second object based on the first resource utilization rate and the second resource utilization rate comprises:

constructing a first resource utilization rate curve and a second resource utilization rate curve, the first resource utilization rate curve and the second resource utilization rate curve corresponding to the first resource utilization rate and the second resource utilization rate, respectively;

acquiring a Euclidean distance between the first resource utilization rate curve and the second resource utilization rate curve; and performing inverse distance processing on the Euclidean distance to determine the first resource utilization similarity rate.

10. An electronic device for grouping objects in a data management system, comprising:

at least one processor; and a memory coupled to the at least one processor and having instructions stored thereon, wherein the instructions, when executed by the at least one processor, cause the electronic device to perform actions comprising:

detecting operation parameters of at least two objects of a plurality of objects operating in the data management system, wherein the operation parameters comprise traffic of each of the at least two objects in a predetermined time interval and a communication connection value indicating a state of a connection between the at least two objects;

determining a rate of correlation between the at least two objects based on the detected operation parameters including based on the traffic of each of the objects and based on the communication connection value indicating a state of connection between the at least two objects, wherein the rate of correlation indicates a degree of correlation between the at least two objects, and wherein determining the rate of correlation between the at least two objects comprises determining a first rate of connection between a first object and a second object based on a first communication connection value indicating a state of connection between the first object and the second object, determining a first traffic load rate between the first object and the second object based on first traffic of the first object and second traffic of the second object, and determining, as the rate of correlation, a first rate of correlation between the first object and the second object based on the first rate of connection and the first traffic load rate;

comparing the determined rate of correlation with a predetermined threshold; and determining, based on the comparison of the determined rate of correlation with the predetermined threshold, grouping of the at least two objects.

11. The electronic device according to claim 10, wherein the instructions, when executed by the at least one processor, further cause the electronic device to perform the following:

constructing a topological graph based on the determined rate of correlation, wherein nodes in the topological graph represent the at least two objects, respectively, and connection lines between the nodes represent rates of correlation between corresponding objects.

12. The electronic device according to claim 11, wherein determining the first rate of connection between the first object and the second object based on the first communication connection value indicating the state of connection between the first object and the second object comprises:

determining an average communication connection value of the first communication connection values in the predetermined time interval; and determining the average communication connection value as the first rate of connection.

13. The electronic device according to claim 11, wherein determining the first traffic load rate between the first object and the second object based on the first traffic of the first object and the second traffic of the second object comprises:

acquiring third traffic of communication between the first object and the second object in the predetermined time interval; and determining a sum of the first traffic and the second traffic as total traffic of the first object and the second object; and determining the first traffic load rate according to a ratio of the third traffic to the total traffic.

14. The electronic device according to claim 11, wherein determining the first rate of correlation between the first object and the second object based on the first rate of connection and the first traffic load rate comprises:

determining the rate of correlation between the first object and the second object based on a first weight, a second weight, the first rate of connection, and the first traffic load rate, wherein a sum of the first weight and the second weight is 1.

15. The electronic device according to claim 11, wherein the at least two objects operate on corresponding computing nodes in the data management system, the corresponding computing nodes comprising operation resources that comprise at least one of processor resources, memory resources, and virtual disk resources, and the operation parameters further comprise at least one resource utilization rate of a utilization of at least one of the operation resources by each of the at least two objects.

16. A non-transitory machine-readable medium having instructions stored therein, which when executed by a processor, cause the processor to perform operations of grouping objects in a data management system, the operations comprising:

detecting operation parameters of at least two objects of a plurality of objects operating on the data management system, wherein the operation parameters comprise traffic of each of the at least two objects in a predetermined time interval and a communication connection value indicating a state of a connection between the at least two objects;

determining a rate of correlation between the at least two objects based on the detected operation parameters including based on the traffic of each of the objects and based on the communication connection value indicating a state of connection between the at least two objects, wherein the rate of correlation indicates a degree of correlation between the at least two objects, and wherein determining the rate of correlation between the at least two objects comprises determining a first rate of connection between a first object and a second object based on a first communication connection value indicating a state of connection between the first object and the second object, determining a first traffic load rate between the first object and the second object based on first traffic of the first object and second traffic of the second object, and determining, as the rate of correlation, a first rate of correlation between the first object and the second object based on the first rate of connection and the first traffic load rate;

comparing the determined rate of correlation with a predetermined threshold; and determining, based on the comparison of the determined rate of correlation with the predetermined threshold, grouping of the at least two objects.

* * * * *